US008313725B2

(12) United States Patent
Loutfy et al.

(10) Patent No.: US 8,313,725 B2
(45) Date of Patent: Nov. 20, 2012

(54) READY-TO-SINTER SPINEL NANOMIXTURE AND METHOD FOR PREPARING SAME

(75) Inventors: Raouf O. Loutfy, Tucson, AZ (US); Juan L. Sepulveda, Tucson, AZ (US); Sekyung Chang, Tucson, AZ (US)

(73) Assignee: Materials and Electrochemical Research (MER) Corporation, Tucson, AZ (US)

( * ) Notice: Subject to any disclaimer, the term of this patent is extended or adjusted under 35 U.S.C. 154(b) by 535 days.

(21) Appl. No.: 12/460,451

(22) Filed: Jul. 16, 2009

(65) Prior Publication Data

US 2010/0056357 A1    Mar. 4, 2010

Related U.S. Application Data

(60) Provisional application No. 61/135,034, filed on Jul. 16, 2008.

(51) Int. Cl.
- *C01B 13/14* (2006.01)
- *C01F 5/02* (2006.01)
- *C01F 5/14* (2006.01)
- *C01F 11/02* (2006.01)
- *C04B 35/03* (2006.01)

(52) U.S. Cl. .................. 423/636; 423/594.16; 501/119; 501/120

(58) Field of Classification Search .................. 501/118, 501/119, 120; 423/600, 594.16, 636; 264/1.21
See application file for complete search history.

(56) References Cited

U.S. PATENT DOCUMENTS

| | | | |
|---|---|---|---|
| 3,768,990 A * | 10/1973 | Sellers et al. .................. 65/17.5 |
| 4,543,341 A | 9/1985 | Barringer et al. |
| 4,543,346 A | 9/1985 | Matsui et al. |
| 4,930,731 A | 6/1990 | Roy et al. |
| 4,983,555 A | 1/1991 | Roy et al. |
| 5,070,050 A * | 12/1991 | Dupon et al. .................. 501/108 |
| 5,098,740 A * | 3/1992 | Tewari ........................ 427/215 |
| 5,244,849 A | 9/1993 | Roy et al. |
| 5,273,942 A * | 12/1993 | McCauley et al. ........... 501/97.1 |
| 7,211,325 B2 | 5/2007 | Villalobos et al. |
| 7,344,895 B2 | 3/2008 | Kohler et al. |
| 7,528,086 B2 | 5/2009 | Villalobos et al. |
| 2004/0266605 A1 * | 12/2004 | Villalobos et al. ............ 501/108 |

* cited by examiner

*Primary Examiner* — Noah Wiese

(57) ABSTRACT

An in-situ method for nanomixing magnesium aluminate spinel nanoparticles with a uniformly distributed controlled concentration of nanoparticles of an inorganic sintering aid, such as LiF, to produce ready-to-sinter spinel powder. The spinel-sintering aid nanomixture is formed by induced precipitation of the sintering aid nanoparticles from a dispersion of the spinel nanoparticles in an aqueous solution of the sintering aid, followed by separation, drying and deagglomeration of the spinel-sintering aid nanomixed product.

23 Claims, 3 Drawing Sheets

READY-TO-SINTER SPINEL NANOMIXTURE AND METHOD FOR PREPARING SAME

This application claims the benefit of U.S. Provisional Application No. 61/135,034, filed Jul. 16, 2008.

This invention was made with Government support under Government contract No. FA8650-06-M-5507, awarded by the U.S. Air Force. The Government has certain rights in the invention.

FIELD OF THE INVENTION

The present invention relates to the field of sintered ceramic products, and more particularly, to the production of a ready-to-sinter magnesium aluminate spinel nanomixture powder.

BACKGROUND OF THE INVENTION

Magnesium aluminate spinel, $MgAl_2O_4$, (hereinafter "spinel") is a very attractive ceramic material for use in various applications requiring a rugged, tough, scratch resistant, transparent material. Examples include both military applications such as protective windows for aircraft and armored vehicles, armor, missile domes, protective goggles, ruggedized computers and displays, and laser weapons, as well as commercial applications, such as fixed and portable point of sale (POS) terminals, watch crystals, vapor lamp tubes, firefighter and police face shields, laptop computers, cell phones, automotive glassing and headlamps, industrial blast shields, and transparent orthodontic fixtures. Spinel articles have a wide transparency range from visible to 5.5 μm wavelength, and mechanical properties several times greater than that of glass while being remarkably lighter than ballistic glass by a factor of 2 for the same degree of armor ballistic protection.

The consolidation of commercially available high purity spinel powder into dense, highly transparent monolithic shape parts, is carried out through a sintering process at high temperature. The sintering process may be pressure assisted as in hot pressing, or it may be pressureless. In order for spinel powder to be effectively sintered, it must be intimately mixed prior to sintering with very small amounts of particles of an inorganic sintering aid, such as lithium fluoride (LiF), which helps in reducing and homogenizing the grain size and eliminating porosity in the sintered product. As illustrated by such prior art patents as the Sellers et al. U.S. Pat. No. 3,768,990, issued Oct. 30, 1973, the Roy et al. U.S. Pat. No. 4,930,731, issued Jun. 5, 1990, the Roy et al. U.S. Pat. No. 4,983,555, issued Jan. 8, 1991, and the Roy et al. U.S. Pat. No. 5,244,849, issued Sep. 14, 1993, this has traditionally been accomplished by some form of mechanical mixing of the sintering aid particles with the spinel powder, such as a mortar and pestle, ball milling, attritor milling or high shear wet milling.

There have been numerous attempts to develop an economically viable plant scale manufacturing process for the commercial production of dense, highly transparent, defect-free spinel articles. The inability to achieve high yields of uniformly transparent shapes has been a nagging problem thwarting these attempts. All too often, the final products exhibit opaque or hazy regions, leading to high rejection rates. These product defects have been found to be due primarily to inhomogeneous mixing of the sintering aid particles with the spinel powder prior to sintering, resulting in non-uniform distribution of sintering aid during the sintering process. Adding to this inhomogeneity problem is a contamination problem caused by the mechanical mixing techniques themselves, since even low ppm levels of impurities from the abrasion of the grinding media can cause opaque or hazy regions in the final product.

The foregoing problems associated with the mechanical mixing of the sintering aid particles with the spinel powder prior to sintering have been addressed by Villalobos et al. in U.S. Patent Application Publication No. 2004/0266605, published Dec. 30, 2004, U.S. Pat. No. 7,211,325, issued May 1, 2007, and U.S. Pat. No. 7,528,086, issued May 5, 2009. The solution proposed by Villalobos et al. is to form a coating of the sintering aid on the spinel particles by the spray drying of a dispersion of spinel particles in a solution of the sintering aid. While the Villalobos et al. spray drying approach does achieve a more uniform distribution of sintering aid within the spinel powder, it does so at the expense of a significant sacrifice in spinel powder yield, which has been found to be no better than about 68%. This means that up to 32% of spinel powder processed through the spray dryer will wind up being lost. This low production yield, coupled with possible contamination added during spray drying derived from solution pumping, dryer heater, hot air contamination and contact with the metallic components of the spray dryer, all tend to seriously detract from the commercial appeal of this approach.

It should be noted that throughout the above-referenced U.S. Patent Application Publication No. 2004/0266605, Villalobos et al. specifically caution against allowing precipitation of the dissolved sintering aid among the spinel particles in the dispersion to be spray dried. See, for example, paragraphs 0017, 0027, 0030 and 0044.

SUMMARY OF THE INVENTION

The present invention addresses the very same problems as in the above-referenced Villalobos et al. patent application publication, but takes an entirely different approach which is actually a direct departure from the above-noted Villalobos et al. teachings. The present invention actually takes advantage of sintering aid precipitation, and resides in an in-situ method, employing induced precipitation of inorganic sintering aid nanoparticles from a dispersion of spinel nanoparticles in an aqueous solution of the sintering aid, for producing ready-to-sinter spinel powder consisting of a nanomixture of the spinel nanoparticles and a uniformly distributed, controlled concentration of the sintering aid nanoparticles.

The method of the present invention comprises the steps of mixing the spinel nanoparticles with an aqueous solution of the inorganic sintering aid to form a spinel dispersion; decreasing the solubility limit of the inorganic sintering aid in the spinel dispersion to a point sufficiently low so as to induce precipitation of nanoparticles of the inorganic sintering aid out of solution and into a mixed dispersion with the spinel nanoparticles; separating from the mixed dispersion an in-situ formed nanomixture of the spinel nanoparticles and the sintering aid nanoparticles; drying the spinet—sintering aid nanomixture; and deagglomerating the dried spinet—sintering aid nanomixture.

In carrying out the above-described method, the concentration of the inorganic sintering aid in the aqueous solution, the relative proportions of aqueous solution and spinel nanoparticles employed in forming the spinel dispersion, the extent of solubility limit decrease in the precipitation step, and the retention time of the precipitation step, are all selected and coordinated so as to provide the deagglomerated dried spinet—sintering aid nanomixture with a uniformly distributed controlled concentration of inorganic sintering aid nanoparticles in a perfectly dispersed discrete mix of spinel nanoparticles and sintering aid nanoparticles.

The in-situ induced-precipitation nanomixing method of the present invention has several important advantages over the Villalobos et al. spray drying coating technique. Most significantly, it increases the spinel powder yield from the 68% range to very close to 100%, making it commercially more attractive due to savings realized in spinel powder utilization. In addition, by requiring the use of only plastic and glassware equipment and ambient temperature operation, it eliminates any possible contamination problems and the high capital equipment and energy costs associated with the spray drying equipment and operation.

DESCRIPTION OF PREFERRED EMBODIMENTS

Figure 1:
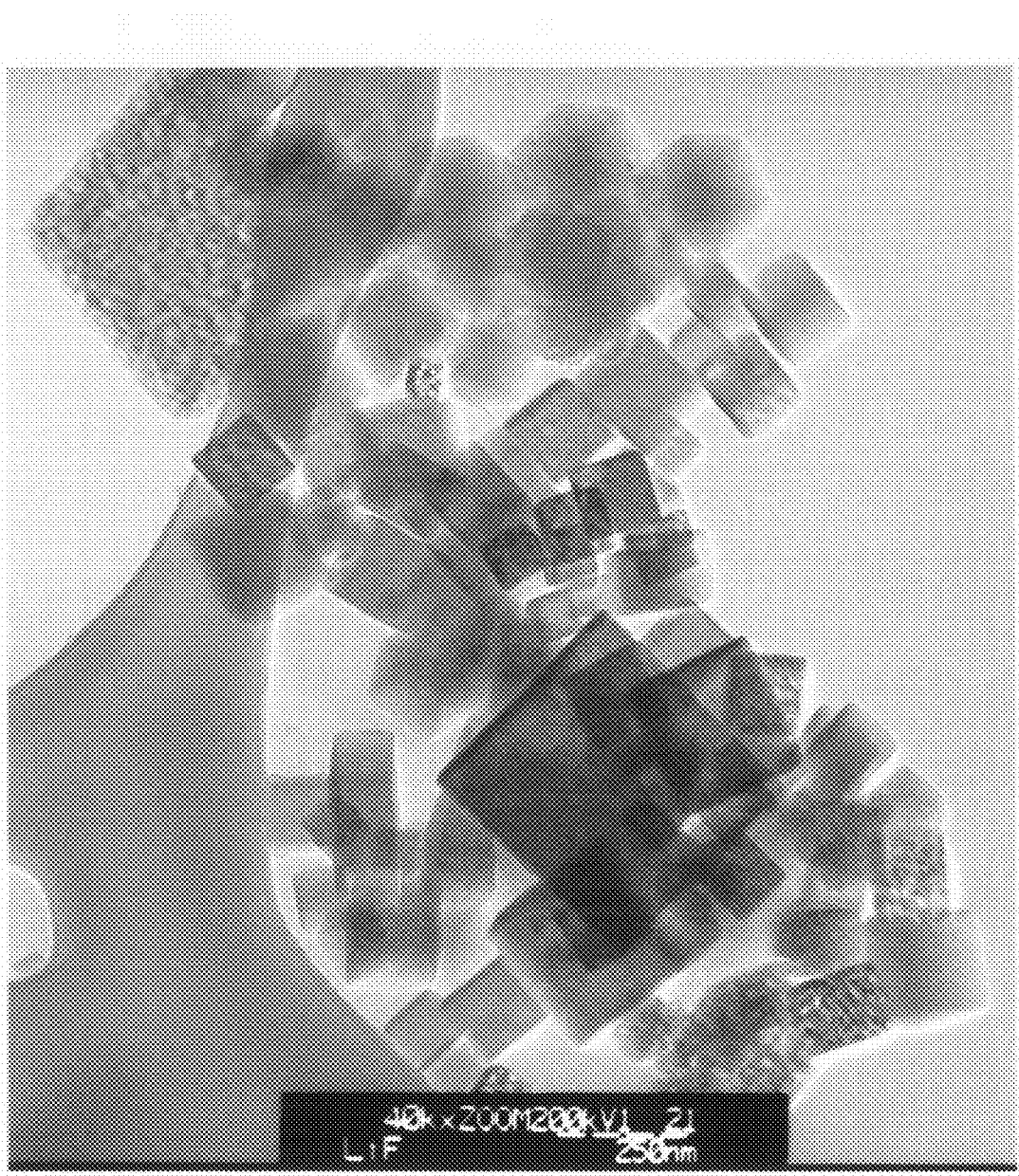
FIG. 1 is a transmission electron microscope (TEM) photomicrograph at 40 kx magnification showing typical LiF sintering aid nanoparticles which are formed by induced precipitation in carrying out the method in accordance with the present invention.

In accordance with the present invention, ready-to-sinter spinel powder is produced by an in-situ method for nanomixing magnesium aluminate spinel nanoparticles with a uniformly distributed controlled concentration of nanoparticles of an inorganic sintering aid. The spinel nanoparticles used in forming the nanomixture may be any of the commercially available high purity spinel nanopowders having average particle sizes of 200-300 nm with a top size of 2-3 microns, obtainable, for example, from Baikowski International Corporation, Charlotte, N.C., or Ceralox-Sasol North America, Tucson, Ariz. The inorganic sintering aid nanoparticles of the nanomixture will be formed by in-situ precipitation during the course of carrying out the processing steps of the present invention, and will tend to be somewhat smaller in particle size than the spinel nanoparticles in the nanomixture, with particle sizes ranging from 11 nm to 350 nm and averaging from 60 nm to 80 nm as revealed by TEM analyses.

The starting materials for carrying out the method of the present invention are the spinel nanoparticles and an aqueous solution of the inorganic sintering aid. In preparing the aqueous solution, it is important to use only distilled water so as to avoid any possible mineral contamination in the end product. To be suitable for use in the present invention, the inorganic sintering aid must be one whose solubility limit in water both is adequate for preparing an appropriate aqueous solution and also is readily reducible for inducing sintering aid nanoparticle precipitation from the solution. Since LiF meets these requirements and is the sintering aid most typically used in the sintering of spinel, it is the sintering aid of choice in the present invention.

Accordingly, for the sake of simplicity, the invention will be further described with reference to LiF as the sintering aid, although it will be understood that the invention is equally as applicable to other sintering aids meeting the above requirements.

In the spinel-LiF nanomixture produced in accordance with the present invention, the controlled concentration of LiF will be in the range of from about 0.2 to about 2.0 weight percent, preferably from about 0.4 to about 1.25 weight percent, and optimally from about 0.5 to about 0.75 weight percent.

In the LiF aqueous solution starting material, the LiF concentration will advantageously approach the LiF solubility limit in water to facilitate the precipitation-inducing step. While the theoretical solubility limit of LiF in water at room temperature is 2.7 g/l, this extent of dissolution has been found to be extremely difficult to achieve and therefore impractical. As a practical matter, the maximum amount of LiF that has been found to be easily dissolvable in 1 liter of water at room temperature is approximately 1.5 grams. Consequently, LiF aqueous solutions with LiF concentrations of from about 1 to about 1.5 g/l, preferably about 1.5 g/l, have been found to be appropriate as the LiF aqueous solution starting material in the method of the present invention.

In carrying out the method of the present invention, the spinel nanoparticles are first thoroughly mixed with the LiF aqueous solution to form a spinel nanodispersion, for example, under ultrasonic field for 30 minutes. The relative proportions of LiF aqueous solution and spinel nanoparticles employed in forming the spinel dispersion will depend upon the target controlled concentration of LiF in the final spinel-LiF nanomixture. For reasons which will be explained hereinafter, these relative proportions will be such as to provide the dispersion with a LiF concentration relative to the spinel nanoparticles of from about 65 to about 75 percent in excess of such target controlled concentration.

The thus formed spinel nanodispersion is then subjected to treatment to decrease the solubility limit of the LiF in the dispersion to a point sufficiently low so as to induce precipitation of LiF nanoparticles out of solution and into a mixed dispersion with the spinel nanoparticles. While this step will typically take place at ambient temperature, it may, if desired, be carried out at any temperature within the range of from ambient up to 100° C.

The precipitation-inducing solubility limit decrease may be effectively carried out by the addition to the spinel dispersion of a sufficient amount of a water-miscible alcohol, such as ethanol, in which LiF has limited solubility. Again, to avoid any possible contamination in the end product, only high purity alcohol should be used. The amount of alcohol added to the dispersion is preferably such as to increase the alcohol concentration in the dispersion to as high as about 8.6 molar.

The extent of solubility limit decrease and, in turn, the proportion of the LiF dissolved in the spinel dispersion that will precipitate out of solution, is directly related to the volume ratio of the added alcohol to the LiF aqueous solution employed in forming the spinel dispersion. Ideally, the highest alcohol to aqueous solution volume ratio should be used in order to precipitate out most of the LiF. On the other hand, if that volume ratio is too high, it will adversely affect uniform distribution of the LiF in the final spinel-LiF nanomixture. A suitable compromise is to maintain that volume ratio in a range of from about 0.8:1 to about 1.2:1, preferably about 1:1. At this volume ratio, only approximately 60% of the LiF dissolved in the spinel dispersion will precipitate out of solution, and the remaining 40% will stay dissolved. This is the reason behind the excess LiF concentration in the spinel dispersion described above.

It should be noted that for a fixed alcohol to aqueous solution volume ratio, for example, the preferred ratio of 1:1, and a fixed LiF concentration in the aqueous solution, for example, the preferred LiF concentration of 1.5 g/l, the amount of dissolved LiF which will precipitate out of solution can be varied for a given amount of spinel nanoparticles simply by changing the total amount of LiF aqueous solution employed in forming the spinel dispersion.

Another factor having a direct effect on the amount of dissolved LiF which will precipitate out of solution is the retention time of the precipitation step. Within certain limits, the amount of LiF precipitated will increase with increasing retention time. Retention time will generally be within the range of from about 10 minutes to about 3 hours, preferably from about 30 minutes to about 2 hours.

The precipitation step is followed by separating from the resulting mixed dispersion an in-situ formed nanomixture of LiF nanoparticles and spinel nanoparticles. The separation may be carried out, for example, by centrifugation, sedimentation or filtration. The spinel-LiF nanomixture is then dried at 100-120° C., and the dried nanomixture is then deagglomerated, for example, by rolling the powder with a metallic roller while the powder is contained and protected by its own plastic bag.

The resulting deagglomerated dried spinel-LiF nanomixture is a ready-to-sinter spinel powder. By the proper selection and coordination of the LiF concentration in the aqueous solution employed in forming the spinel dispersion, the relative proportions of aqueous solution and spinel nanoparticles employed in forming the spinel dispersion, the extent of solubility limit decrease in the precipitation step, and the retention time of the precipitation step, as well as the operating temperature, the spinel powder product will have a controlled concentration of LiF nanoparticles uniformly distributed therethrough in a perfectly dispersed discrete mix of spinel nanoparticles and LiF nanocrystallites.

Figure 2:
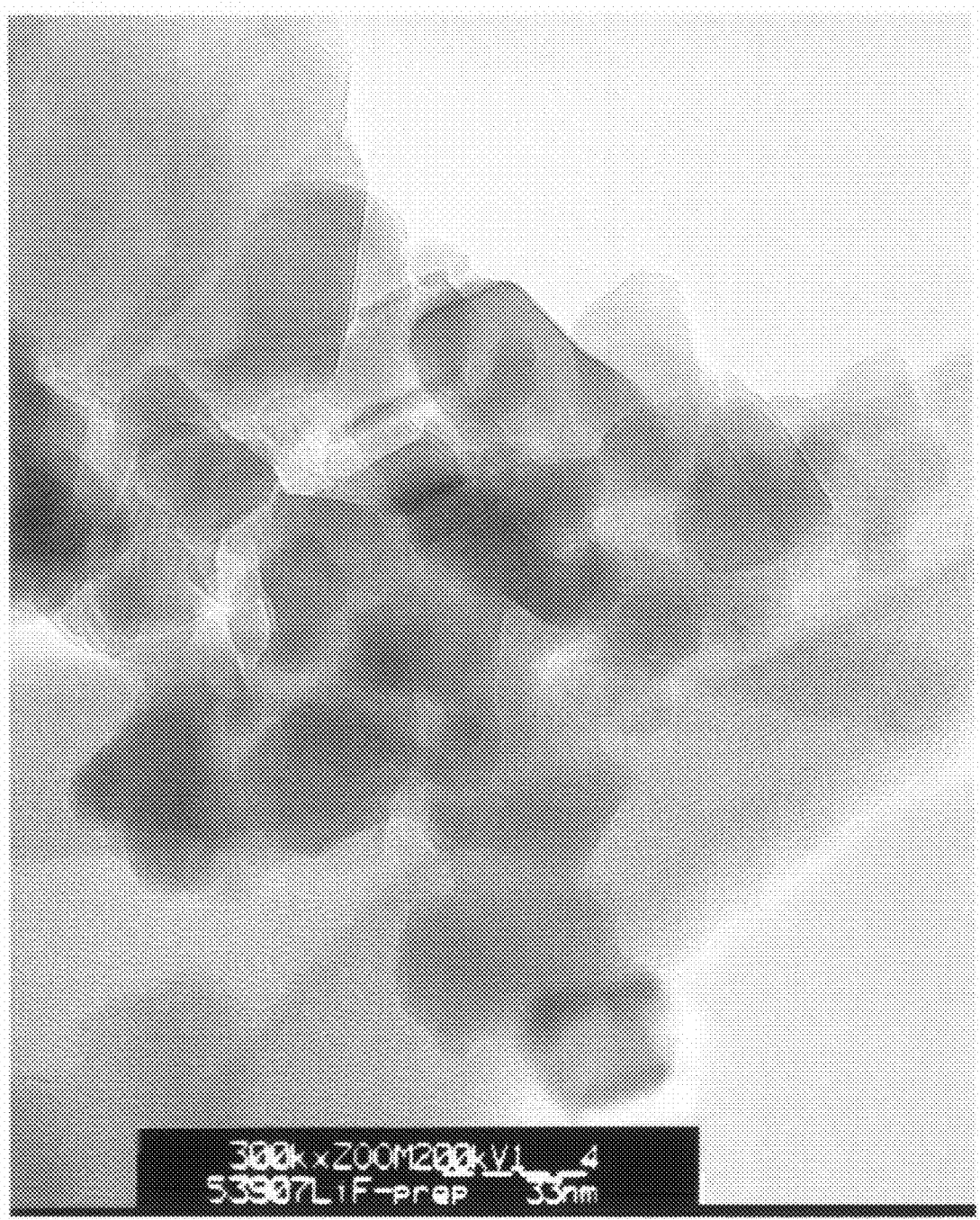
FIG. 2 is a TEM photomicrograph at 300 kx magnification showing a typical nanomixture of precipitated LiF sintering aid nanoparticles with spinel nanopowder as produced in accordance with the present invention.

FIG. 1 is a transmission electron microscope (TEM) photomicrograph showing typical LiF nanocrystallites which are formed by induced precipitation in carrying out the method of the present invention. Results based on TEM reveal the LiF nanocrystallites or nanoparticles are typically 20-80 nm in a distribution of nanoparticles that encompasses from as fine as 10 nm to as coarse as 350 nm. The TEM photomicrograph of FIG. 2 shows a typical nanomixture of these LiF nanoparticles with spinel nanopowder as produced by means of the method of the present invention. Extensive TEM analyses also reveal no signs of LiF coating onto the spinel nanoparticulate using the techniques of the present invention.

The ready-to-sinter spinel powder consisting of the deagglomerated dried spinel-LiF nanomixture can be readily densified into a transparent sintered spinel body, either by hot pressing or by pressureless sintering, in each case followed by hot isostatic pressing. A suitable hot pressing profile comprises LiF liquefaction at 950° C. for 30 to 75 minutes, followed by LiF sublimation at 1150° C. to 1350° C. for 1 to 4 hours, followed by sintering at 1550° C. to 1900° C. for 2 to 4.5 hours under a ram pressure of from 500 to 5000 psi. A suitable pressureless sintering profile would be similar, differing only in the final sintering stage of the profile, which would be 1650° C. to 1900° C. for 2 to 3 hours, with no applied pressure. Hot isostatic pressing may be carried out at 1600° C. to 1750° C. at a pressure of 30 Ksi for 2 to 5 hours.

Figure 3:
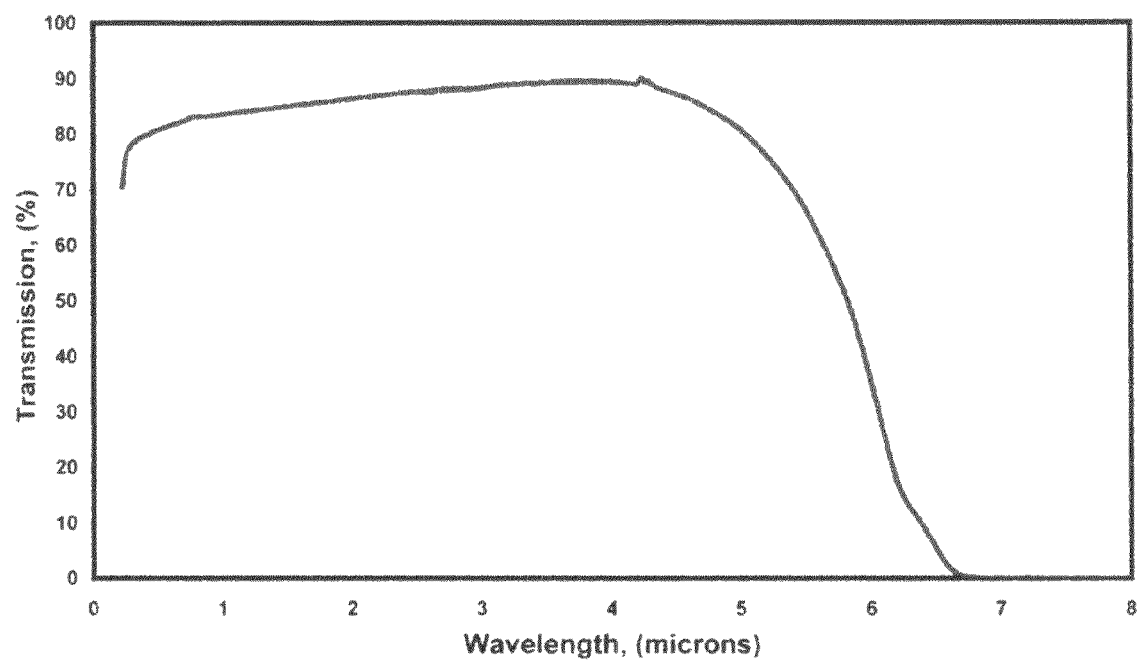
FIG. 3 is a graph showing typical transmission properties of mechanically polished densified spinel products produced from the spinel nanomixture powder prepared in accordance with the present invention.

As illustrated by the transmission properties graph of FIG. 3, the resulting transparent sintered spinel body densified to 99.95+% theoretical density, after being rendered and mechanically polished, exhibits transmission properties higher than 83% at 1 atm, 88% at 4 µm, and 65% at 5.5 µm wavelength.

The invention is further illustrated by way of the following examples.

EXAMPLE 1

This example shows the preparation of a ready-to-sinter spinel-LiF nanomixture having a 0.6 wt. % LiF concentration in accordance with the present invention, and the sintering thereof to form a transparent spinel disk.

Ten grams of spinel nanopowder provided by Ceralox-Sasol North America, Tucson, Ariz., was slurried and ultrasonically dispersed into 70 cc of LiF solution containing 1.5 g/l LiF in distilled water. Then they were mixed with 70 cc of ethanol (200 proof ethanol), which induced precipitation of LiF nanoparticles. The precipitation was allowed to proceed for 60 minutes. After solid liquid separation by centrifugation, the solid residue was dried at 100° C. in a Pyrex tray and deagglomerated. The resulting product was 10 grams of a ready-to-sinter spinel-LiF nanopowder having 0.6 weight % LiF concentration consisting of a nanomixture of spinel and LiF nanoparticles. No surface coating of LiF species onto the spinel particles was observed after TEM characterization. EDS analyses also confirmed the occurrence of very well dispersed discrete nanomixture of the nanosize spinel and nanosize LiF for the powder prepared in this experiment.

The powder prepared as above was hot pressed at a maximum temperature of 1600° C. for one hour in a 30 Ton Centorr hot pressed at a maximum pressure of 5000 psi. After hot pressing, the spinel compact was hot isostatically pressed at 1750° C. for 5 hours at 29,750 psi, in an argon atmosphere. A sintered spinel ceramic disk 99.95+% theoretical density was obtained, with transmission higher than 83% at 1 µm, 88% at 4 µm, and 65% at 5.5 µm wavelength. The spinel disk did not show up any discoloration, white inclusions, or other defects.

EXAMPLE 2

This example shows the preparation of a ready-to-sinter spinel-LiF nanomixture having a 0.625 wt % LiF concentration in accordance with the present invention, on a somewhat larger scale than in Example 1.

In a 10 gallon plastic pail, 9.375 liters of 23° C. LiF solution (1.5 g/l LiF in distilled water) were added to 1.325 kg of spinel powder. After ultrasonic dispersion for 60 minutes, 9.375 liters of ethanol were added. The nanosize LiF precipitation was carried out for 60 minutes, at 23° C. temperature. After solid liquid separation by centrifugation, the solid residue was dried at 100° C. in a Pyrex tray and deagglomerated. 1.325 kg of 0.625 wt % LiF of nanomixed spinel powder was produced.

The powder as prepared above was sintered by hot pressing followed by hot isostatic pressing as described in Example 1, with similar results.

EXAMPLE 3

This example illustrates that for a fixed alcohol to aqueous solution volume ratio, e.g., 1:1, and a fixed LiF concentration in the aqueous solution, e.g., 1 g/l, the amount of dissolved LiF which will precipitate out of solution in accordance with the method of the present invention, can be varied for a given amount of spinel nanoparticles simply by changing the total amount of LiF aqueous solution employed in forming the spinel dispersion.

In this example, to prepare three different spinel samples with three different concentrations of LiF, three 10 g samples of spinel nanopowder were mixed with three different volumes of LiF solution containing 1 g/l LiF in distilled water, i.e., 84 cc, 100 cc and 104 cc, respectively. Then a volume of alcohol equal to the volume of LiF solution was added to each sample. The nanosize LiF was allowed to precipitate for 30 minutes. ICP analyses of the residual spinel powder for LiF concentration (LiF concentration back-calculated from Li ICP analyses) showed that the amount of nanosize LiF precipitated among 10 g of nanosize spinel, was changed from 0.23 wt. % to 0.27 wt. % to 0.3 wt. % by changing the amount of LiF solution from 84 cc to 100 cc to 104 cc, respectively.

What is claimed is:

1. An in-situ method for nanomixing magnesium aluminate spinel nanoparticles with a uniformly distributed controlled concentration of nanoparticles of an inorganic sintering aid to produce ready-to-sinter spinel powder consisting essentially of a perfectly dispersed discrete mix of said spinel nanoparticles and said sintering aid nanoparticles and being essentially free of sintering aid-coated spine nanoparticles, said method comprising the steps of:
   (a) mixing said spinel nanoparticles with an aqueous solution of said inorganic sintering aid to form a spinel dispersion;
   (b) decreasing the solubility limit of said inorganic sintering aid in said spinel dispersion to a point sufficiently low so as to induce precipitation of nanoparticles of said inorganic sintering aid out of solution and into a mixed dispersion with said spinel nanoparticles;
   (c) separating from said mixed dispersion an in-situ formed nanomixture of said spinel nanoparticles and said sintering aid nanoparticles;
   (d) drying the spinel-sintering aid nanomixture; and
   (e) deagglomerating the dried spinel-sintering aid nanomixture;
   wherein the concentration of said inorganic sintering aid in said aqueous solution, the relative proportions of aqueous solution and spinel nanoparticles employed in forming said spinel dispersion, the extent of solubility limit decrease in the precipitation step, and the retention time of the precipitation step are all selected and coordinated so as to provide the deagglomerated dried spinel-sintering aid nanomixture with said uniformly distributed controlled concentration of inorganic sintering aid nanoparticles.

2. The method of claim 1, wherein the step of decreasing the solubility limit of said inorganic sintering aid in said spinel dispersion is carried out at a temperature within the range of from ambient up to 100° C.

3. The method of claim 2, wherein said inorganic sintering aid is LiF, the concentration of LiF in said aqueous solution is about 1.5 g/l, and said controlled concentration is within the range of from about 0.5 to about 0.75 weight percent.

4. An in-situ method for nanomixing magnesium aluminate spinel nanoparticles with a uniformly distributed controlled concentration of nanoparticles of LiF sintering aid to produce ready-to-sinter spinel powder, comprising the steps of:
   (a) mixing said spinel nanoparticles with an aqueous solution of LiF to form a spinel dispersion;
   (b) decreasing the solubility limit of said LiF in said spinel dispersion to a point sufficiently low so as to induce precipitation of nanoparticles of LiF out of solution and into a mixed dispersion with said spinel nanoparticles, said solubility limit decrease being carried out at a temperature within the range of from ambient up to 100° C. and comprising adding to said spinel dispersion a sufficient amount of a water-miscible alcohol in which LiF has limited solubility;
   (c) separating from said mixed dispersion an in-situ formed nanomixture of said spinel nanoparticles and said LiF nanoparticles;
   (d) drying the spinel-LiF nanomixture; and
   (e) deagglomerating the dried spinel-LiF nanomixture;
   wherein the concentration of LiF in said aqueous solution, the relative proportions of aqueous solution and spinel nanoparticles employed in forming said spinel dispersion, the extent of solubility limit decrease in the precipitation step, and the retention time of the precipitation step are all selected and coordinated so as to provide the deagglomerated dried spinel-LiF nanomixture with said uniformly distributed controlled concentration of LiF nanoparticles.

5. The method of claim 4, wherein said controlled concentration is within the range of from about 0.2 to about 2.0 weight percent.

6. The method of claim 5, wherein said controlled concentration is within the range of from about 0.4 to about 1.25 weight percent.

7. The method of claim 6, wherein said controlled concentration is within the range of from about 0.5 to about 0.75 weight percent.

8. The method of claim 5, wherein the concentration of LiF in said aqueous solution is from about 1 to about 1.5 g/l.

9. The method of claim 7, wherein the concentration of LiF in said aqueous solution is about 1.5 g/l.

10. The method of claim 4, wherein said alcohol is ethanol.

11. The method of claim 4, wherein the amount of alcohol added to said spinel dispersion is such as to increase the alcohol concentration in said dispersion to as high as about 8.6 molar.

12. The method of claim 4, wherein said alcohol is added to said spinel dispersion in an alcohol to aqueous solution volume ratio of from about 0.8:1 to about 1.2:1.

13. The method of claim 12, wherein said alcohol to aqueous solution volume ratio is about 1:1.

14. The method of claim 13, wherein the concentration of LiF in said aqueous solution is about 1.5 g/l, and said controlled concentration is within the range of from about 0.5 to about 0.75 weight percent.

15. The method of claim 5, wherein the retention time of the precipitation step is from about 10 minutes to about 3 hours.

16. The method of claim 14, wherein the retention time of the precipitation step is from about 30 minutes to about 2 hours.

17. The method of claim 4, including the further step of densifying the deagglomerated dried spinel-LiF nanomixture into a transparent sintered spinel body.

18. The method of claim 17, wherein the densifying step is carried out by hot pressing followed by hot isostatic pressing.

19. The method of claim 18, wherein the hot pressing profile comprises LiF liquefaction at 950° C. for 30 to 75 minutes, followed by LiF sublimation at 1150° C. to 1350° C. for 1 to 4 hours, followed by sintering at 1550° C. to 1900° C. for 2 to 4.5 hours under a ram pressure of from 500 to 5000 psi.

20. The method of claim 19, wherein the hot isostatic pressing is carried out at 1600° C. to 1750° C. at a pressure of 30 Ksi for 2 to 5 hours.

21. The method of claim 17, wherein the densifying step is carried out by pressureless sintering followed by hot isostatic pressing.

22. The method of claim 21, wherein the presureless sintering profile comprises LiF liquefaction at 950° C. for 30 to 75 minutes, followed by LiF sublimation at 1150° C. to 1350° C. for 1 to 4 hours, followed by sintering at 1650° C. to 1900° C. for 2 to 3 hours.

23. The method of claim 22, wherein the hot isostatic pressing is carried out at 1600° C. to 1750° C. at a pressure of 30 Ksi for 2 to 5 hours

\* \* \* \* \*